United States Patent

Anderson et al.

[11] Patent Number: 5,201,390
[45] Date of Patent: Apr. 13, 1993

[54] BRAKE SHOE HOLD DOWN SPRING

[75] Inventors: Bruce D. Anderson, Granger; Orla L. Holcomb, Jr., South Bend, both of Ind.

[73] Assignee: Allied-Signal Inc., Morristown, N.J.

[21] Appl. No.: 890,512

[22] Filed: May 28, 1992

[51] Int. Cl.⁵ .................................. F16D 51/00
[52] U.S. Cl. .......................... 188/340; 411/347
[58] Field of Search ............... 188/340, 341, 250 F, 188/250 R, 250 A; 411/347, 352, 371, 539

[56] References Cited

U.S. PATENT DOCUMENTS

| | | | |
|---|---|---|---|
| 1,803,396 | 5/1931 | Brie | 188/250 R X |
| 1,904,262 | 4/1933 | Bendix et al. | 188/250 R X |
| 2,022,254 | 11/1935 | Pentz | 188/341 X |
| 2,263,949 | 11/1941 | Harle | 188/340 |
| 3,232,388 | 2/1966 | Gancel | 188/78 |
| 4,623,050 | 11/1986 | Copp | 188/340 |
| 4,790,704 | 12/1988 | Tempe et al. | 188/340 X |

FOREIGN PATENT DOCUMENTS 1109268 1/1956 France ............... 188/340

Primary Examiner—Robert J. Oberleitner
Assistant Examiner—Kevin D. Rutherford
Attorney, Agent, or Firm—Larry J. Palguta; Ken C. Decker

[57] ABSTRACT

The shoe hold down spring (40) comprises a single wave form or serpentine shaped leaf spring (40) which is engaged at opposite ends (42, 44) by hold down pins (53, 55) of a drum brake. The hold down pins (53, 55) are connected with the backing plate (12) and extend through respective openings (21, 23) within a brake shoe web (20). The hold down spring (40) includes opposite ends (42, 44) and a middle portion (41) all of which extend away and are spaced-apart from the shoe web (20), and two intermediate curved portions (47, 49) which engage the web (20). The opposite ends (42, 44) of the hold down spring (40) have slots (43, 45) extending inwardly from spring edges (42A, 44A), and small curved recesses (42B, 44B) which effect securement of ends (53A, 55A) of the pins (53, 55) to the spring (40). The pins (53, 55) have laterally extending wings (53B, 55B) at the pin ends (53A, 55A) which are received within the small curved recesses (42A, 44A) at the respective ends (42, 44) of the spring (40).

10 Claims, 2 Drawing Sheets

BRAKE SHOE HOLD DOWN SPRING

The present invention relates generally to a hold down spring for a drum brake shoe, and in particular to a wave form or serpentine leaf spring which cooperates with two hold down pins to hold the drum brake shoe in place relative to a backing plate.

Drum brakes include a pair of drum brake shoes each of which has a rim with friction material attached thereto and a radially inwardly extending brake shoe web. The drum brake shoes are mounted on a backing plate of the drum brake and typically held in place by conventional hold down mechanisms. A conventional hold down mechanism may comprise a hold down pin connected at one end with the backing plate of the drum brake, and the other end extending through an opening in the web of the brake shoe and having a coil spring and cup extending between the other end of the pin and the web of the brake shoe. Larger drum brake shoes typically have two web openings through which respective hold down pins extend, with each pin including a coil hold down spring and cup. It is highly desirable to provide a simplified and lower cost hold down mechanism for the drum brake shoe of a drum brake. The hold down mechanism should have as few parts as possible, the parts should provide plural functions, be easily assembled, and have a low cost. Occasions arise whereby the space envelope available for the hold down mechanism is limited and prevents the use of a coil spring. Therefore, a desirable characteristic is a small space intrusion of the hold down spring around certain areas of the hold down pin. The present invention provides solutions to the above problems by providing a brake shoe hold down spring in a drum brake, the drum brake comprising a pair of brake shoes wherein one brake shoe includes a shoe web having therein a pair of spaced-apart openings, hold down mechanisms connected with a backing plate of said drum brake and extending through the respective openings in said web, and the brake shoe hold down spring comprising a single wave form spring engaged at opposite ends by said mechanisms, the hold down spring having a serpentine shape such that opposite ends of the spring and a middle portion of the spring extend away and are spaced apart from the shoe web, two curved portions of the spring engaging the web, and the opposite ends of the spring having means for receiving the mechanisms so that ends of the mechanisms are captured within said receiving means.

One way of carrying out the invention is described in detail below with reference to the drawings which illustrate an embodiment in which.

Figure 1:
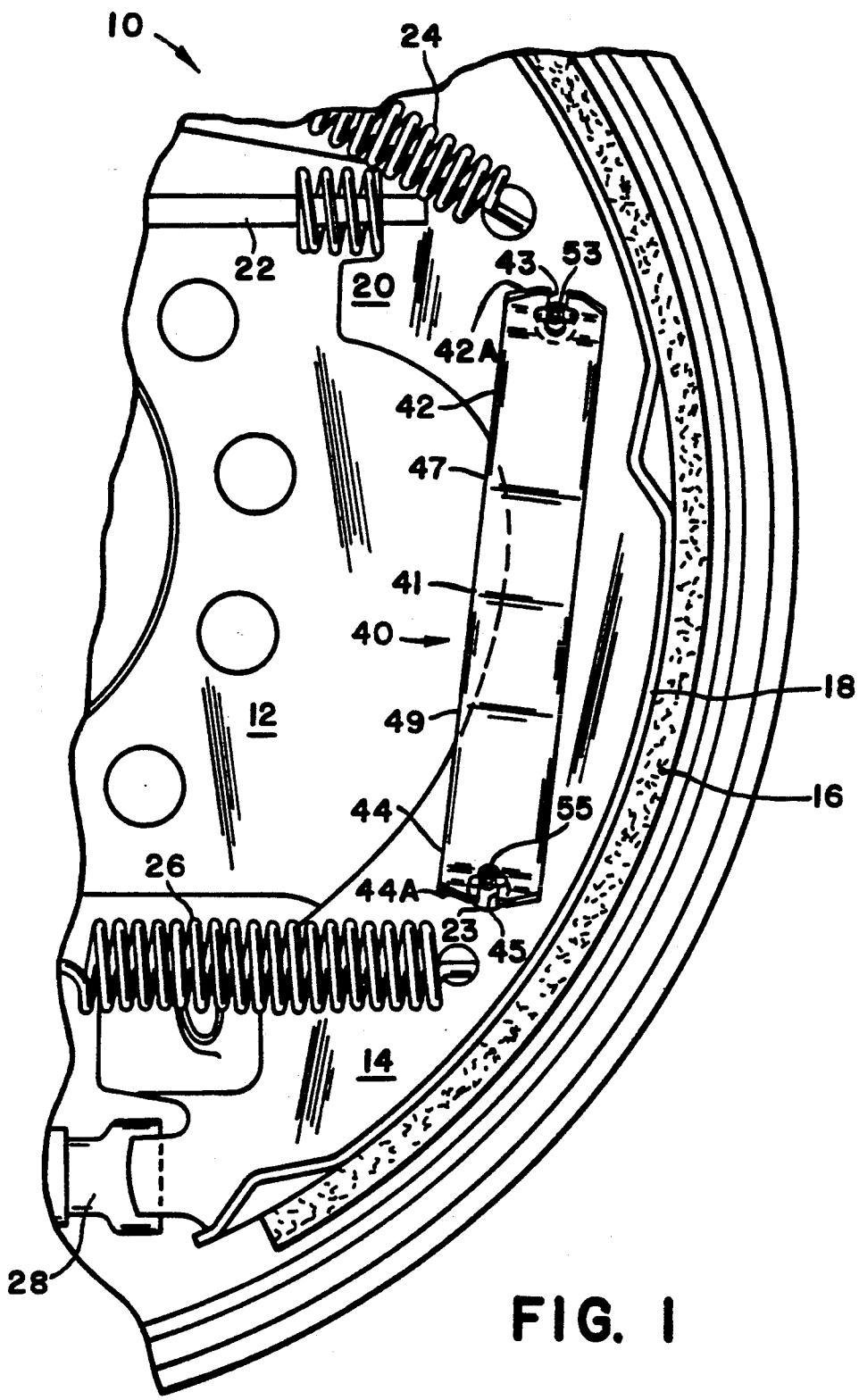
FIG. 1 is a view of a part of a drum brake including a drum brake shoe, backing plate, hold down pins, and the shoe hold down spring of the present invention.
Figure 2:
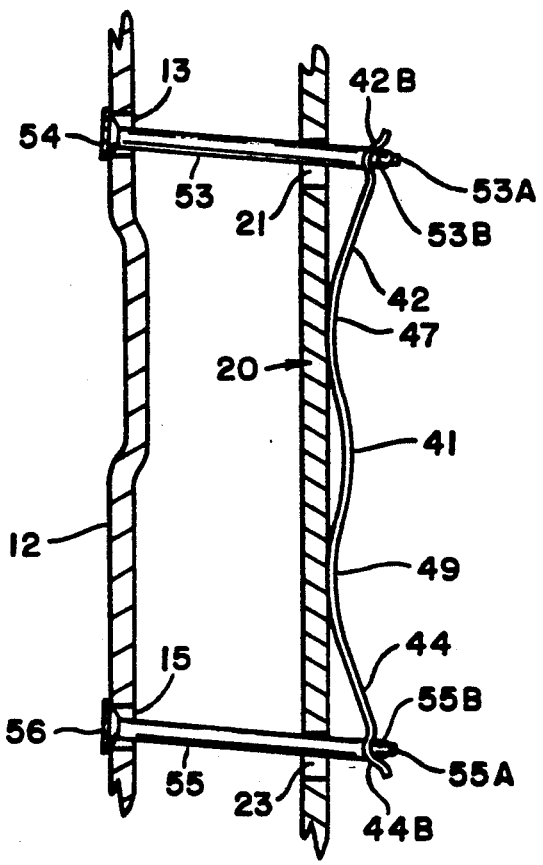
FIG. 2 is a partial schematic section view of the backing plate, hold down pins, shoe web and shoe hold down spring of the present invention.
Figure 3:
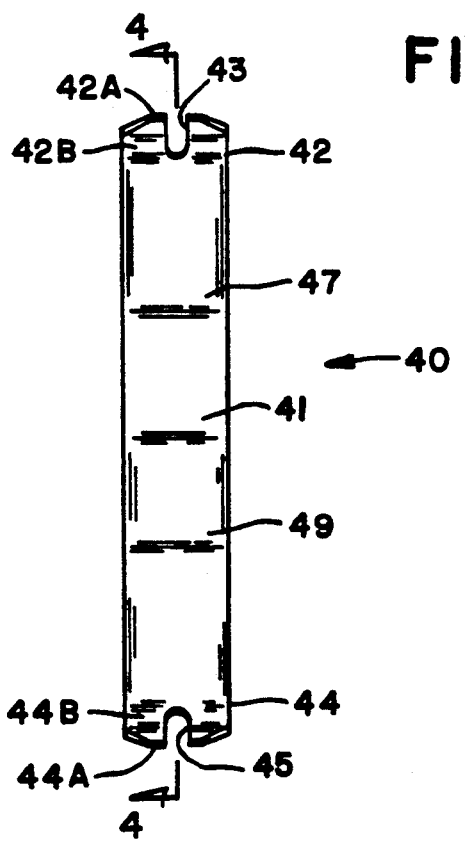
FIG. 3 is a view of the hold down spring of the present invention.
Figure 4:
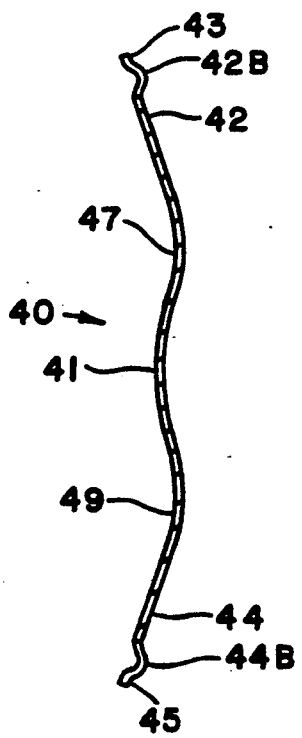
FIG. 4 is a section view of the hold down spring shown in FIGS. 1-3.

FIG. 1 illustrates in part a typical drum brake designated generally by reference numeral 10. Drum brake 10 includes backing plate 12 on which is mounted, at one side, a drum brake shoe 14. Drum brake shoe 14 includes friction pad 16, shoe rim 18, and shoe web 20. One end of shoe 14 is engaged by a wheel cylinder (not shown), a parking strut 22, and a return spring 24, while the other end of the shoe is engaged by return spring or shoe-to-shoe spring 26 and one end of a typical starwheel adjuster designated generally by reference numeral 28. The shoe hold down spring of the present invention is designated generally by reference numeral 40 and includes opposite ends 42 and 44 which include slots 43, 45 extending inwardly from end edges 42A, 44A. Extending through slots 43, 45 are respective hold down pins 53 and 55. As illustrated in FIG. 2, backing plate 12 includes a pair of openings 13 and 15 which provide seats for curved heads 54 and 56 of pins 53, 55. Brake shoe web 20 includes a pair of spaced-apart openings 21 and 23 which have larger diameters than the diameters of the respective pins 53, 55. Pins 53, 55 extend through the openings and ends 53A, 55A each include a pair of laterally extending wings 53B, 55B which are received within small curved recesses 42B, 44B of the spring ends 42,44. Spring 40 comprises a wave form or serpentine leaf spring which includes ends 42, 44 and middle portion 41 that extend away and are spaced-apart from brake shoe web 20. Two intermediate curved portions 47 and 49 extend toward and engage brake shoe web 20. Thus, spring ends 42 and 44 are forced downwardly toward shoe web 20 when pin ends 53A, 55A are attached thereto, so that spring 40 biases the shoe web axially relative to the drum brake and toward backing plate 12.

Drum brake shoe 14 is assembled to backing plate 12 in the following manner. Pins 53, 55 are inserted through backing plate openings 13, 15 and drum brake shoe 14 is placed in position on backing plate 12 such that pins 53, 55 also extend through respective shoe web openings 21, 23. Hold down spring 40 is placed adjacent each of the pin ends 53A, 55B such that intermediate curved portions 47 and 49 of spring 40 engage shoe web 20. The spring is moved longitudinally so that one pin end 53A or 55B is received within the associated slot 43 or 45. Once the pin is in the slot, the associated wings (53B or 55B) are received within the respective small curved recess 42B or 44B so that the wings are captured therein and the pin end will not disengage from the end of the spring. The other spring end is bent downwardly so that the associated pin end may be moved through or into the slot, whereupon the pin is in position, or pivoted or turned, so that the associated pin wings are disposed perpendicularly relative to the longitudinal axis of spring 40 and captured within the associated small curved recess.

The shoe hold down spring provides substantial advantages over prior hold down mechanisms for drum brake shoes. A single wave form or serpentine leaf spring is utilized in place of two coil springs and two cups utilized in prior constructions. The small size of spring end 42B or 44B is much less that the radius of a coil spring having the same hold down force thereby providing for minimal space requirements radially outward in one direction from the pin 53 or 55. The hold down spring is easily assembled to the pins during the assembly of the drum brake, and cooperates existing readily available parts comprising the hold down pins, drum brake shoes, and backing plates. The hold down spring is easily and inexpensively manufactured, and one part provides the hold down function which comprises two separate connections with the backing plate at spaced apart, opposite portions of the shoe web. Thus, a common part provides two identical functions to effect the coupling of the brake shoe with the backing plate.

We claim:

1. A brake shoe hold down spring in a drum brake, the drum brake comprising a pair of brake shoes wherein one brake shoe includes a shoe web having therein a pair of spaced-apart openings, hold down mechanisms connected with a backing plate of said drum brake and extending through the respective openings in said web, and the brake shoe hold down spring comprising a single wave form spring engaged at opposite ends by said mechanisms, the hold down spring having a serpentine shape such that opposite ends of the spring and a middle portion of the spring extend away and are spaced apart from the shoe web, two curved portions of the spring engaging the web, and the opposite ends of the spring having means for receiving the mechanisms so that ends of the mechanisms are captured within said receiving means.

2. The brake shoe hold down spring in accordance with claim 1, wherein the opposite ends of the spring include slots which extend inwardly from respective end edges of the spring.

3. The brake shoe hold down spring in accordance with claim 2, wherein each opposite end of the spring includes a small curved recess which extends toward the web in order to capture an associated end of the respective hold down mechanism and prevent the associated end from moving out of the respective slot.

4. The brake shoe hold down spring in accordance with claim 3, wherein the openings in the web are substantially larger than respective diameters of the hold down mechanism.

5. The brake shoe hold down spring in accordance with claim 4, wherein the ends of the mechanisms each include laterally extending wings which are received within the respective curved recess in order to couple the mechanisms with the brake shoe hold down spring.

6. The brake shoe hold down spring in accordance with claim 4, wherein each hold down mechanism comprises a pin which extends longitudinally from a circular head connected pivotably with the backing plate to wings at the end of the mechanism received in the respective curved recess.

7. The brake shoe hold down spring in accordance with claim 1, wherein each opposite end of the spring includes a small curved recess which extends toward the web in order to capture an associated end of the respective hold down mechanism and prevent the associated end from moving out of the respective slot.

8. The brake shoe hold down spring in accordance with claim 1, wherein the openings in the web are substantially larger than respective diameters of the hold down mechanism.

9. The brake shoe hold down spring in accordance with claim 8, wherein the ends of the mechanisms each include laterally extending wings which are received within the respective curved recess in order to couple the mechanisms with the brake shoe hold down spring.

10. The brake shoe hold down spring in accordance with claim 9, wherein the opposite ends of the spring include slots which extend inwardly from respective end edges of the spring.

* * * * *